(12) United States Patent
Nishihata et al.

(10) Patent No.: US 9,791,614 B2
(45) Date of Patent: Oct. 17, 2017

(54) VEHICLE LAMP FITTING

(71) Applicant: Ichikoh Industries, Ltd., Kanagawa (JP)

(72) Inventors: Koji Nishihata, Kanagawa (JP); Genta Matsumura, Kanagawa (JP); Hideyuki Hayashi, Kanagawa (JP)

(73) Assignee: Ichikoh Industries, Ltd., Kanagawa (JP)

( * ) Notice: Subject to any disclaimer, the term of this patent is extended or adjusted under 35 U.S.C. 154(b) by 0 days.

(21) Appl. No.: 14/762,962

(22) PCT Filed: Jan. 30, 2014

(86) PCT No.: PCT/JP2014/000488
§ 371 (c)(1),
(2) Date: Jul. 23, 2015

(87) PCT Pub. No.: WO2014/119318
PCT Pub. Date: Aug. 7, 2014

(65) Prior Publication Data
US 2015/0362659 A1    Dec. 17, 2015

(30) Foreign Application Priority Data

Feb. 1, 2013    (JP) .................................. 2013-018694

(51) Int. Cl.
*B60Q 1/00*    (2006.01)
*F21V 8/00*    (2006.01)
(Continued)

(52) U.S. Cl.
CPC ......... *G02B 6/0055* (2013.01); *B60Q 1/0052* (2013.01); *F21S 48/115* (2013.01);
(Continued)

(58) Field of Classification Search
CPC  B60Q 1/0052; F21S 48/1241; F21S 48/2237; F21S 48/2268; G02B 6/001; G02B 6/0035; G02B 6/0038
See application file for complete search history.

(56) References Cited

U.S. PATENT DOCUMENTS 4,765,701 A    8/1988  Cheslak
4,977,487 A    12/1990 Okano
(Continued)

FOREIGN PATENT DOCUMENTS

DE    202012000567 U1    3/2012
DE    10201105161 A1    5/2012
(Continued)

OTHER PUBLICATIONS

European Search Report for EP Application No. 14746760.9, 8 pages, Sep. 14, 2016.
(Continued)

*Primary Examiner* — Julie Bannan
(74) *Attorney, Agent, or Firm* — Kagan Binder, PLLC

(57) ABSTRACT

Problem: To provide a vehicle lamp fitting in which regularity of the strength or weakness of the emitted light is maintained and deterioration of appearance is suppressed. Solution: A vehicle lamp fitting 10 comprises a light guide 11 which guides light from an LED light source 12 and an LED light source 13, the light guide 11 having entrance surfaces 110, 111, emission surfaces R1 to R3, and an internally reflecting surface 17 which causes light that has entered through the entrance surfaces 110, 111 to be reflected, and the internally reflecting surface 17 comprises a reflecting surface 141 which is provided in a first region 14 and which emits light from the LED light source 12 in a forward direction, a reflecting surface 151 which is provided in a second region 15 and which emits light from the LED light source 13 in the forward direction, and a reflecting
(Continued)

(a)

surface 161 which is formed in a third region 16 between the first region 14 and the second region 15 and which limits the light intensity with which light from the LED light sources 12, 13 is emitted in the forward direction from the emission surface R3.

2 Claims, 5 Drawing Sheets

(51) Int. Cl.
 *F21S 8/10* (2006.01)
 *F21Y 115/10* (2016.01)
(52) U.S. Cl.
 CPC ......... *F21S 48/1241* (2013.01); *F21S 48/215* (2013.01); *F21S 48/2237* (2013.01); *F21S 48/2268* (2013.01); *F21S 48/2281* (2013.01); *G02B 6/0035* (2013.01); *G02B 6/0038* (2013.01); *F21Y 2115/10* (2016.08)

(56) References Cited

U.S. PATENT DOCUMENTS

| | | | | |
|---|---|---|---|---|
| 6,107,916 | A * | 8/2000 | Beck | B60Q 1/0041 340/468 |
| 6,332,701 | B1 * | 12/2001 | Yamada | B60Q 1/2696 362/237 |
| 6,817,726 | B2 * | 11/2004 | Nowak | G02B 6/0018 362/309 |
| 6,896,397 | B2 | 5/2005 | Yamada et al. | |
| 7,407,311 | B2 * | 8/2008 | Yang | B60Q 1/0052 362/545 |
| 8,120,726 | B2 * | 2/2012 | Suzuki | G02B 6/0038 349/56 |
| 8,529,112 | B2 * | 9/2013 | Kim | G02B 6/0038 362/602 |
| 9,316,373 | B2 * | 4/2016 | Okui | F21S 48/115 |
| 2003/0026106 | A1 * | 2/2003 | Knaack | B60Q 1/0052 362/511 |
| 2006/0139950 | A1 * | 6/2006 | Maeda | G02B 6/0028 362/610 |
| 2008/0002400 | A1 * | 1/2008 | Huang | B60Q 1/0052 362/216 |
| 2008/0074891 | A1 * | 3/2008 | Chuang | B60Q 1/2696 362/351 |
| 2010/0254152 | A1 * | 10/2010 | Taleb-Bendiab | B60Q 1/0035 362/551 |
| 2012/0020103 | A1 * | 1/2012 | Okada | B60Q 1/2607 362/510 |
| 2012/0275190 | A1 * | 11/2012 | Matsumoto | G02B 6/0036 362/609 |
| 2013/0051050 | A1 * | 2/2013 | Yang | B60Q 1/0052 362/516 |
| 2015/0276162 | A1 * | 10/2015 | Shibuya | F21S 48/00 362/518 |
| 2015/0293296 | A1 * | 10/2015 | Kikuchi | G02B 6/0051 362/606 |

FOREIGN PATENT DOCUMENTS

| | | |
|---|---|---|
| EP | 2211087 A2 | 7/2010 |
| EP | 2525139 A2 | 11/2012 |
| JP | 2011-113695 | 6/2011 |
| JP | 2011258350 | 12/2011 |
| JP | 2012238552 A | 12/2012 |

OTHER PUBLICATIONS

Chinese Office Action for CN Application No. 201480006095.6, 4 pages, Oct. 8, 2016.

* cited by examiner

[Fig. 1]
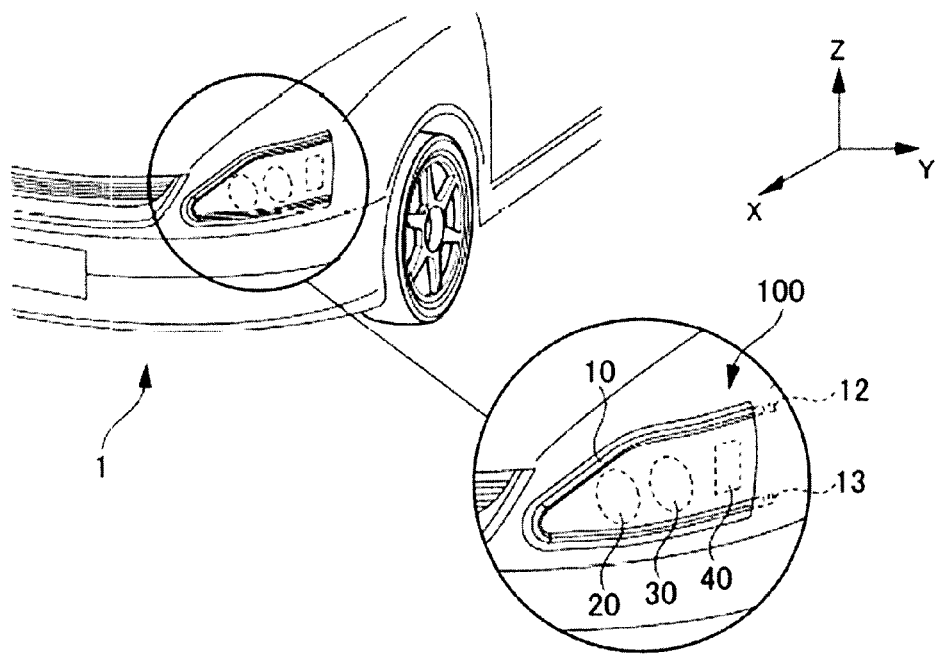
[Fig. 2]
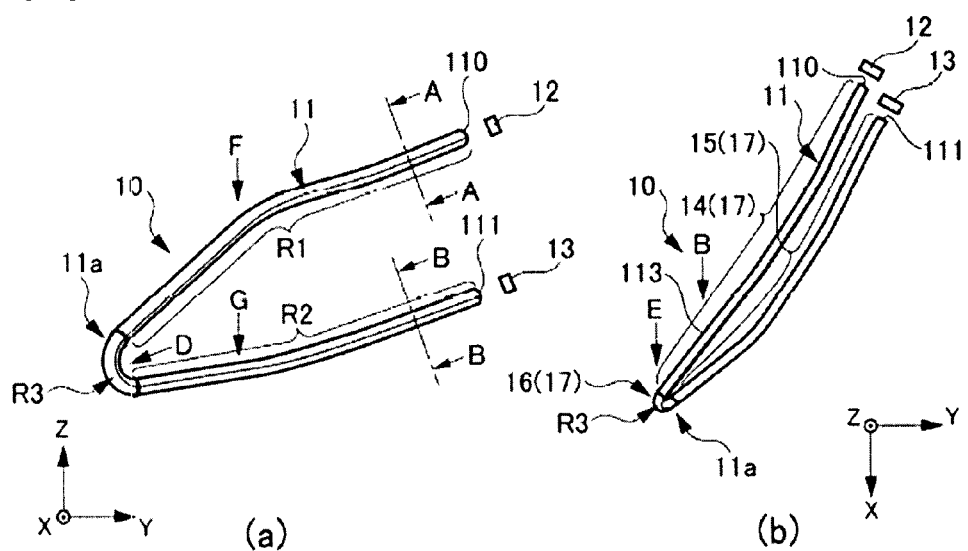

[Fig. 3]
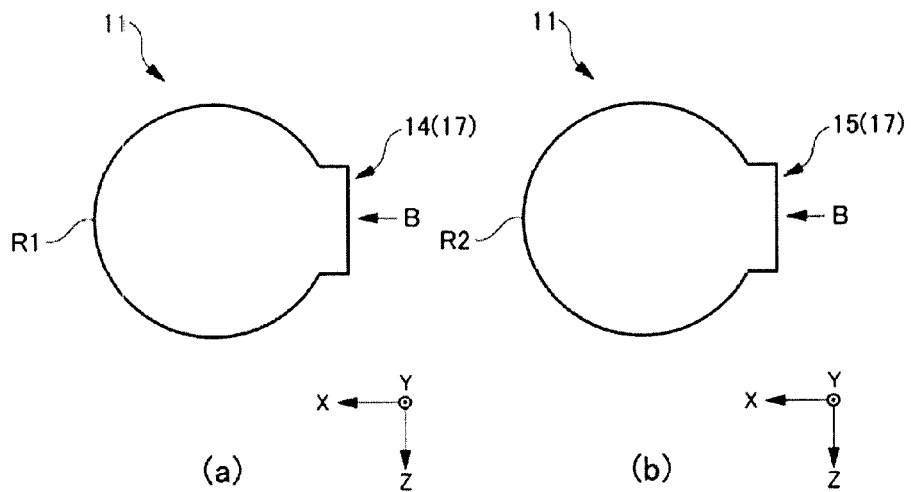
[Fig. 4]
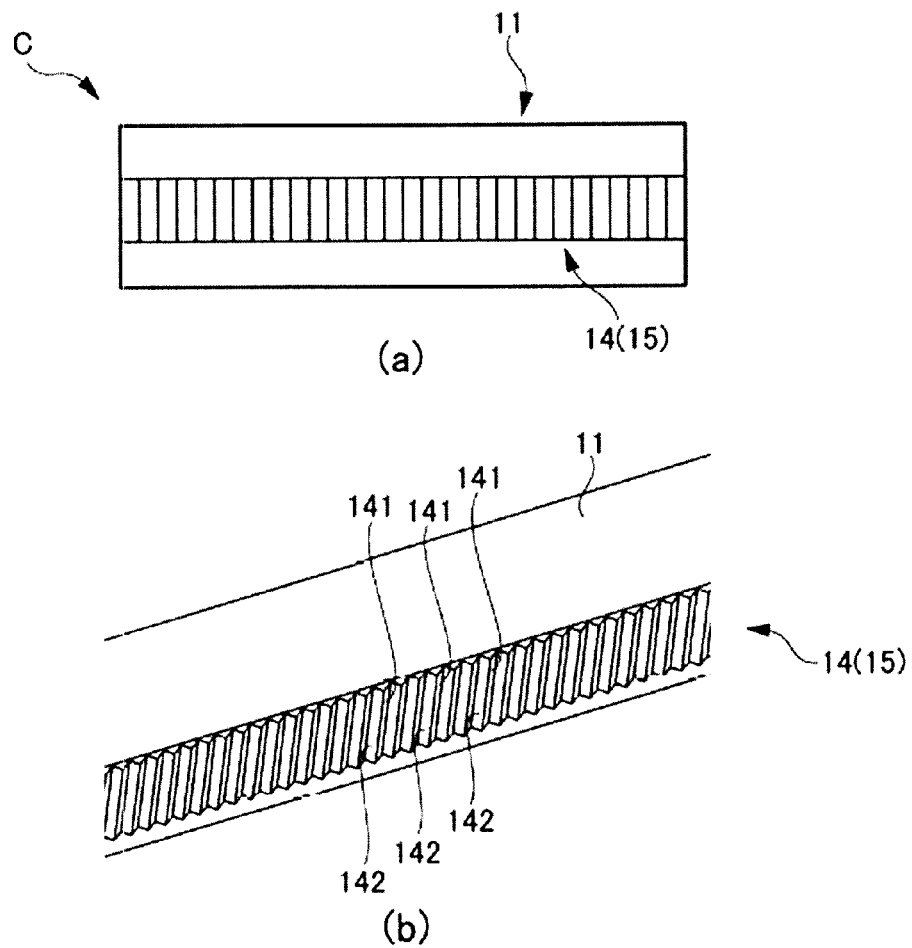

[Fig. 5]
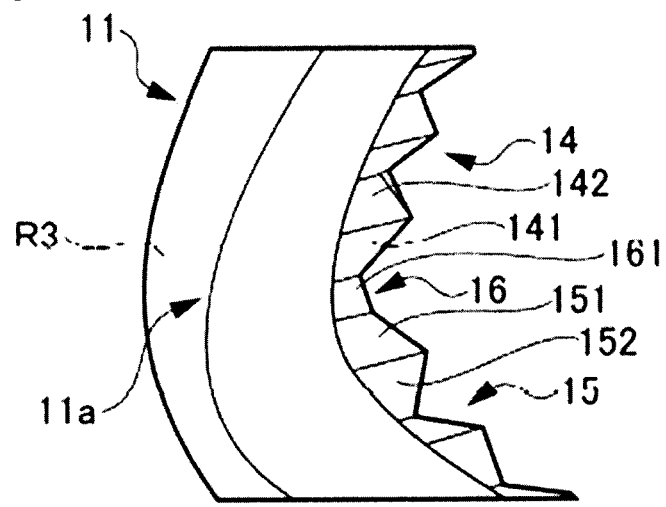
(a)
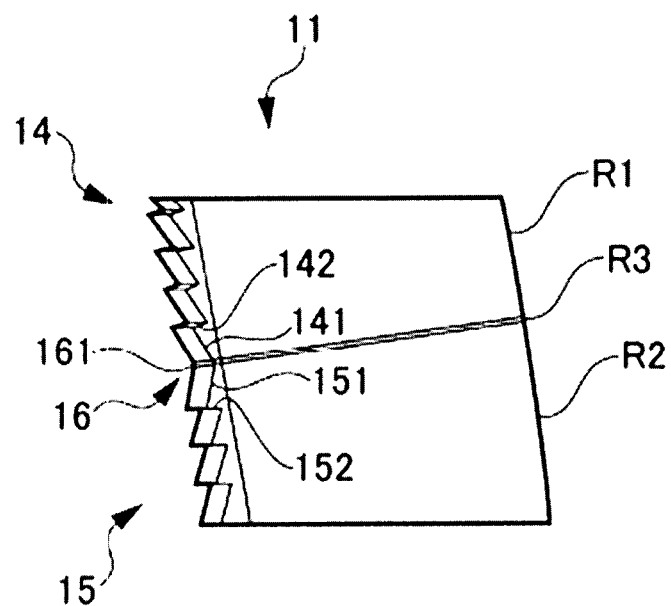
(b)

[Fig. 6]
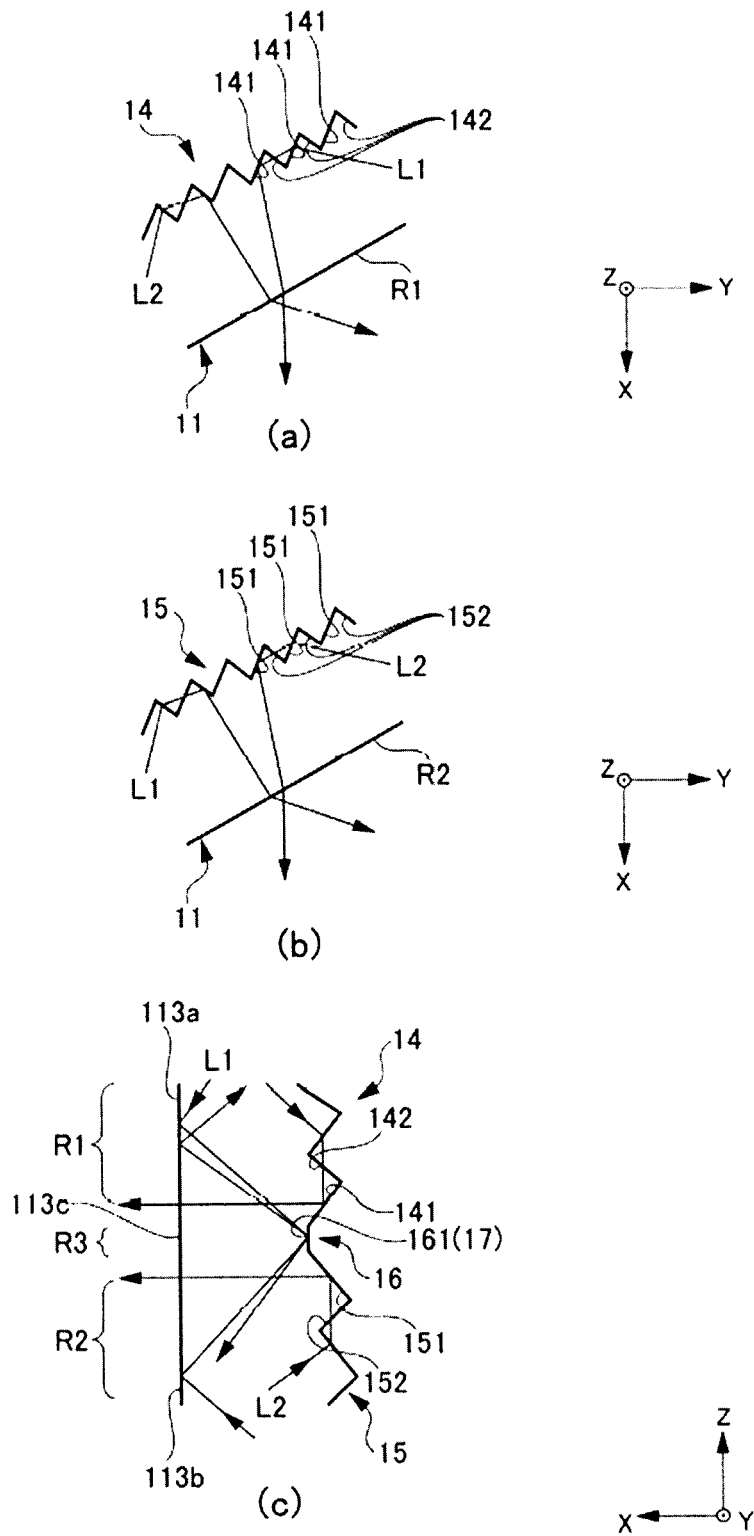

[Fig. 7]
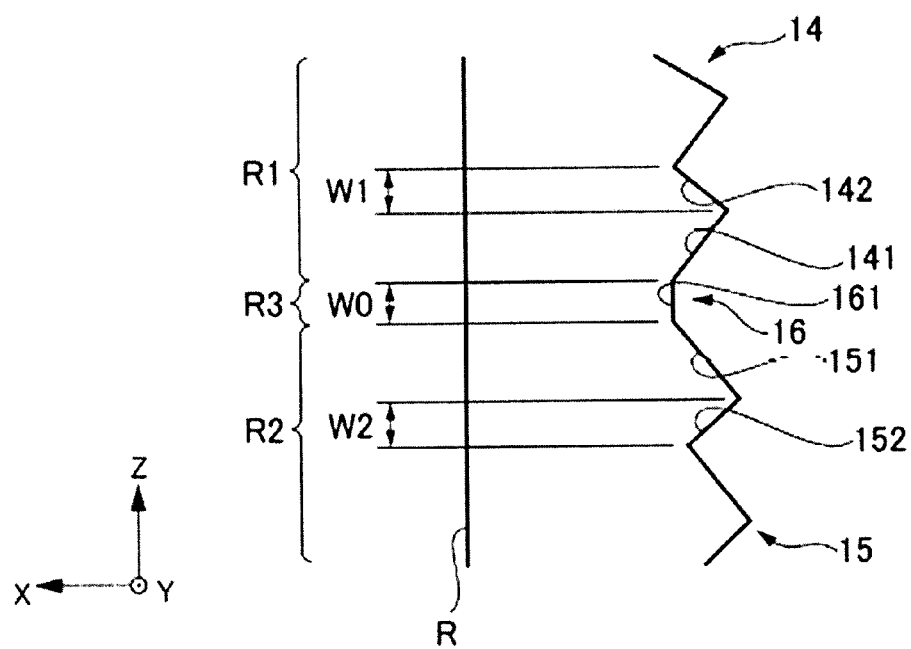

VEHICLE LAMP FITTING

CROSS-REFERENCE TO RELATED APPLICATIONS

This application claims priority to International Application No. PCT/JP2014/000488, filed Jan. 30, 2014, and titled "VEHICLE LAMP FITTING", the disclosure of which application is incorporated herein by reference.

TECHNICAL FIELD

The present invention relates to a vehicle lamp fitting.

BACKGROUND ART

In terms of known vehicle lamp fittings there are those which are provided with an LED (Light Emitting Diode) light source, which serves as a light source, and a light guide. In a light guide, a plurality of reflecting prisms having two reflecting surfaces are formed (see for example JP 2007-109654 A).

There are also known vehicle lamp fittings in which light sources are provided at both ends of a light guide, and light from each of the light sources is controlled by altering the angles of the two reflecting surfaces of a plurality of reflecting prisms provided in neighboring contact from both ends of the light guide, and is emitted from an emitting portion (for example JP 2011-198537 A and JP 2011-216279 A

SUMMARY OF INVENTION

Problem to be Resolved by the Invention

However, in the case of a light guide provided at both ends with a light source, the light intensity is greater in regions in which light guided from both ends overlaps and is emitted, compared with other regions, and light does not radiate uniformly, and thus the appearance deteriorates.

The present invention takes account of such circumstances, and its object is to provide a vehicle lamp fitting in which uniformity of the emitted light is maintained and deterioration of appearance is suppressed.

Means of Overcoming the Problem

The vehicle lamp fitting according to the present invention comprises a first light source, a second light source and a light guide which guides light from the above-mentioned first light source and second light source, the abovementioned light guide having entrance surfaces through which light from the abovementioned first light source and second light source enters, an emission surface from which light that has entered through the abovementioned entrance surfaces is emitted to the outside, and an internally reflecting surface which causes light that has entered through the abovementioned entrance surfaces to be reflected, and the abovementioned internally reflecting surface comprises a first reflecting surface which is provided in a first region and which emits light from the abovementioned first light source in a first direction, a second reflecting surface which is provided in a second region and which emits light from the abovementioned second light source in the abovementioned first direction, and a third reflecting surface which is formed in a third region between the above-mentioned first region and the abovementioned second region and which limits the light intensity with which light from the abovementioned first and second light sources is emitted in the abovementioned first direction.

In the abovementioned invention, the abovementioned third reflecting surface is formed in such a way that it does not emit light to the outside from the above-mentioned emission surface.

In the abovementioned invention, the abovementioned light guide has a bent portion that is bent, and the abovementioned third reflecting surface is formed in the abovementioned bent portion.

In the abovementioned invention, the abovementioned internally reflecting surface comprises a fourth reflecting surface which is formed in the abovementioned first region and is formed in such a way that light from the abovementioned second light source is emitted in a second direction that is different from the abovementioned first direction, and a fifth reflecting surface which is formed in the abovementioned second region and is formed in such a way that light from the abovementioned first light source is emitted in the abovementioned second direction.

Advantages of the Invention

According to the vehicle lamp fitting of the present invention, it is possible to provide a vehicle lamp fitting in which uniformity of the emitted light is maintained and deterioration of appearance is suppressed.

BRIEF DESCRIPTION OF DRAWINGS

Embodiments of the present invention will now be described by way of further example only and with reference to the accompanying drawings, in which:

FIG. 1 is an enlarged schematic view of the area in the vicinity of a headlamp provided with a clearance lamp according to a mode of embodiment.

FIG. 2(a) is a front view of the clearance lamp as viewed from the front of the vehicle, and (b) is a plan view of the clearance lamp as viewed from above the vehicle.

FIG. 3 (a) is a cross-sectional view through A-A in FIG. 2(a), and (b) is a cross-sectional view through B-B in FIG. 2(a).

FIG. 4(a) is a drawing as viewed in the direction of the arrow B shown in FIG. 3, and (b) is a drawing as viewed in the direction of the arrow C shown in (a).

FIG. 5(a) is a drawing of the bent portion of the light guide as viewed in the direction of the arrow D in FIG. 2(a), and (b) is a drawing of the bent portion of the light guide as viewed in the direction of the arrow E in FIG. 2(b).

FIG. 6(a) is a drawing illustrating optical paths within the light guide as viewed from F in FIG. 2(a), (b) is a drawing illustrating optical paths within the light guide as viewed from G in FIG. 2(a), and (c) is a drawing illustrating optical paths within the light guide as viewed from D in FIG. 2(a).

FIG. 7 is a drawing illustrating the light guide as viewed from D in FIG. 2(a).

MODE OF EMBODYING THE INVENTION

A mode of embodying the present invention (hereinafter referred to as embodiment) will now be described in detail with reference to the accompanying drawings. It should be noted that the same numbers are appended to elements that are the same throughout the entire description of the embodiment.

FIG. 1 is an enlarged schematic view of the area in the vicinity of a headlamp 100 according to an embodiment applying the present invention. FIG. 1 illustrates the front portion of a vehicle 1, with a further enlarged illustration of the area in the vicinity of the headlamp 100. Directions X, Y and Z are illustrated in FIG. 1, coinciding respectively with the forward direction of the vehicle 1, the width direction of the vehicle 1 and the height direction of the vehicle 1. The X, Y and Z directions are also illustrated as necessary in the subsequent drawings.

As illustrated in FIG. 1, the headlamp 100 comprises a clearance lamp 10 in the form of a vehicle lamp fitting, a high-beam lamp 20, a low-beam lamp 30 and a directional indicator lamp 40. The high-beam lamp 20, the low-beam lamp 30 and the directional indicator lamp 40 are disposed sequentially from the inside in the width direction of the vehicle 1 to the outside in the width direction.

The clearance lamp 10 is in the form of an elongated rod which extends from the outside in the width direction toward the inside in the width direction above the high-beam lamp 20, the low-beam lamp 30 and the directional indicator lamp 40, bends downward on the inside in the width direction and extends below from the inside in the width direction to the outside in the width direction. Light emerging from these lamps is emitted forward (the X direction).

FIG. 2(a) is a front view of the clearance lamp 10 as viewed from the front of the vehicle 1 illustrated in FIG. 1, and (b) is a plan view of the clearance lamp 10 as viewed from above the vehicle 1 illustrated in FIG. 1.

As illustrated in FIG. 1 and FIG. 2, the clearance lamp 10 comprises an LED light source (a first light source) 12, an LED light source (a second light source) 13 and a light guide 11 which guides light from the LED light source 12 and the LED light source 13.

The LED light source 12 and the LED light source 13 are disposed respectively at either end of the light guide 11. The light guide 11 has an entrance surface 110 through which light from the LED light source 12 enters the interior of the light guide 11, an entrance surface 111 through which light from the LED light source 13 enters the interior of the light guide, an emission surface R from which light that has entered through the entrance surfaces 110, 111 is emitted to the outside, and an internally re-flecting surface 17 which causes light that has entered through the entrance surfaces 110, 111 to be reflected.

The light guide 11 is formed extending in a direction whereby light from the entrance surfaces 110, 111 is guided respectively toward the other end. The light guide 11 has a bent portion 11a that is bent, and the entrance surfaces 110, 111 are positioned to the laterally outer side (Y direction). The emission surface R consists of regions R1 to R3.

The internally reflecting surface 17 comprises a first region 14 corresponding to the emission surface R1, a second region 15 corresponding to the emission surface R2, and a third region 16 between the first region 14 and the second region 15, corresponding to the emission surface R3.

FIG. 3(a) is a cross-sectional view through A-A in FIG. 2(a), and (b) is a cross-sectional view through B-B in FIG. 2(a). FIG. 4(a) is a drawing as viewed in the direction of the arrow B shown in FIG. 3(a) and (b), and (b) is a drawing as viewed in the direction of the arrow C shown in FIG. 4(a), illustrating the element shown in FIG. 3(a). The drawing as viewed in the direction of the arrow corresponding to FIG. 3(b) is symmetrical in form and an explanation thereof is thus omitted. FIG. 5(a) is a drawing of the bent portion 11a of the light guide 11 as viewed in the direction of the arrow D in FIG. 2(a), and (b) is a drawing of the bent portion 11a of the light guide 11 as viewed in the direction of the arrow E (X direction) in FIG. 2(b).

As illustrated in FIG. 2 and FIG. 3, the emission surfaces R1 to R3 which emit light entering from the entrance surfaces 110, 111 to the outside of the light guide 11 are formed in the light guide 11 along the entire light guide 11. The emission surfaces R1 to R3 are each positioned in the forward direction (X direction) of the vehicle 1.

As illustrated in FIG. 3, the cross section of the light guide 11 is substantially circular. FIG. 3 illustrates the light guide 11 in the A-A cross section and the B-B cross section in FIG. 2(a), but cross sections other than the A-A cross section of the light guide 11 are also substantially circular, the light guide 11 having a substantially cylindrical elongated shape.

As illustrated in FIG. 2, FIG. 3 and FIG. 4, in the internally reflecting surface 17, the first region 14 is formed in a position facing the emission surface R1, the second region 15 is formed in a position facing the emission surface R2, and the third region 16 is formed in a position facing the emission surface R3.

Further, as illustrated in FIG. 4 and FIG. 5, in the first region 14 of the internally reflecting surface 17, reflecting surfaces (first reflecting surfaces) 141, by which light from the LED light source 12 is emitted from the emission surface R1 in the forward direction (first direction), and reflecting surfaces (fourth reflecting surfaces) 142, by which light from the LED light source 13 is emitted in a direction to the outside of the vehicle (second direction), which is different from the forward direction, are formed alternately and consecutively from the end portion of the light guide 11 toward the bent portion 11a. By means of this configuration, light portions and dark portions appear alternately in the emission surface R1 when viewed from the front. The reflecting surfaces 141 and the reflecting surfaces 142 are each formed by means of prisms. The prisms are disposed sequentially in neighboring contact from both ends of the light guide 11 toward the bent portion 11a. In the embodiment the prisms consist of triangular prisms, but the shape of the prisms is not restricted to triangular prisms.

Further, in the second region 15 of the internally reflecting surface 17, reflecting surfaces (second reflecting surfaces) 151, by which light from the LED light source 13 is emitted from the emission surface R2 in the forward direction, and reflecting surfaces (fifth reflecting surfaces) 152, by which light from the LED light source 12 is emitted in a direction to the outside of the vehicle, which is different from the forward direction, are formed alternately and consecutively from the end portion of the light guide 11 toward the bent portion 11a. By means of this configuration, light portions and dark portions appear alternately in the emission surface R2 when viewed from the front.

As illustrated in FIG. 5, in the bent portion 11a, the third region 16 of the internally reflecting surface 17 is formed in a region in which the first region 14 of the internally reflecting surface 17 and the second region 15 of the internally reflecting surface 17 meet. A reflecting surface for control (third reflecting surface) 161, which limits the light intensity with which light from the LED light source 12 and the LED light source 13 is emitted from the emission surface in the forward direction, is formed in the third region 16 of the internally reflecting surface 17.

The reflecting surface for control 161 is parallel to the light guide design surface, and is located at a joint portion between prism surfaces which control to the forward direction light that has entered from the entrance surface 110 and the entrance surface 111. In particular, the reflecting surface for control 161 is preferably formed in such a way that it does not emit light to the outside from the third region R3 of the emission surface R.

Further, the width of the reflecting surfaces 141, 151 in the direction in which the light guide 11 extends is preferably greater than the width of the reflecting surfaces 142, 152 in the direction in which the light guide 11 extends.

FIG. 6(a) is a drawing illustrating optical paths within the light guide 11 as viewed from F (Z direction) in FIG. 2(a), (b) is a drawing illustrating optical paths within the light guide 11 as viewed from G in FIG. 2(a), and (c) is a drawing illustrating optical paths within the light guide 11 as viewed from D in FIG. 2(a). In the drawings, light from the LED light source 12 is indicated by L1, and light from the LED light source 13 is indicated by L2.

As illustrated in FIG. 6(a), in the first region 14 of the internally reflecting surface 17, light L1 from the LED light source 12 is emitted in the forward direction from the emission surface R1 by means of the reflecting surfaces 141, and light L2 from the LED light source 13 is emitted in a direction to the outside of the vehicle by means of the reflecting surfaces 142. In the first region 14 of the internally reflecting surface 17, the reflecting surfaces 141 which reflect in the forward direction and the reflecting surfaces 142 which reflect in a direction to the outside of the vehicle are formed alternately, and thus light portions and dark portions appear alternately when viewed from the front of the vehicle.

As illustrated in FIG. 6(b), in the second region 15 of the internally reflecting surface 17, light L2 from the LED light source 13 is emitted in the forward direction from the emission surface R2 by means of the reflecting surfaces 151, and light L1 from the LED light source 12 is emitted in a direction to the outside of the vehicle by means of the reflecting surfaces 152. In the second region 15 of the internally reflecting surface 17, the reflecting surfaces 151 which reflect in the forward direction and the reflecting surfaces 152 which reflect in a direction to the outside of the vehicle are formed alternately, and thus light portions and dark portions appear alternately when viewed from the front of the vehicle.

As illustrated in FIG. 6(c), in the third region 16 of the internally reflecting surface 17, emission in the forward direction, from the emission surface R3, of light from the LED light source 12 and the LED light source 13 is limited by means of the reflecting surface for control 161. Light L1, L2 which is incident upon the reflecting surface for control 161 is reflected respectively upward and downward (Z-axis direction), and the emission surface R3 section appears dark. By this means, a point of light at the emission surface R3 in the vicinity of the center of the light guide 11 can be prevented, uniformity of the light emitted by the light guide 11 can be maintained, and deterioration of the appearance can be suppressed.

Here, the reflecting surface for control 161 should be formed by means of a surface that is substantially parallel to the emission surface R3. By virtue of this configuration, light from the entrance surfaces 110, 111 at both ends can be reliably emitted to the laterally outer side from the emission surface R3, in a direction that is different from the forward direction, and the regularity of the appearance of light portions and dark portions, for example stripes, can be better maintained.

FIG. 7 is a drawing illustrating the light guide 11 as viewed from D (Y direction) in FIG. 2(a).

As illustrated in FIG. 7, the width W0 of the reflecting surface for control 161 in the direction in which the light guide 11 extends is preferably substantially equal to the widths W1, W2 of the reflecting surfaces 142, 152 in the direction in which the light guide 11 extends. As a result, the width of the dark portion formed by means of the reflecting surface for control 161 is approximately the same as the width of the dark portions formed by the reflecting surfaces 142, 152, and uniformity of the emitted light can be maintained.

According to the present embodiment, the reflecting surface for control 161 is provided in the third region 16 in which the first region 14 and the second region 15 of the internally reflecting surface 17 meet, and therefore the light intensity of light from the LED light sources 12, 13 that reflects toward the emission surface R3 can be limited, the emission surface R3 can be prevented from radiating a point of light, uniformity of the light emitted by the light guide 11 can be maintained, and deterioration of the appearance can be suppressed.

The present invention has been described hereinabove with reference to an embodiment, but it goes without saying that the technical scope of the present invention is not limited to the scope described in the abovementioned embodiment. It will be apparent to one skilled in the art that various modifications or improvements can be made to the abovementioned embodiment. It will also be apparent from the scope of the patent claims that modes in which such modifications or improvements have been made can also be included in the technical scope of the present invention. For example, the pattern of light emitted from the emission surface can be varied by adjusting the width or number of the reflecting surfaces in the direction in which the light guide extends. Also, the light guide is not restricted to being bent, but may also be straight or arc-shaped. Further, besides clearance lamps the vehicle lamp fitting of the present invention may also be used in directional indicator lamps, daytime running lamps, stop lamps and tail lamps.

REFERENCE SIGNS LIST

1 . . . vehicle
10 . . . clearance lamp
17 . . . internally reflecting surface
100 . . . headlamp
20 . . . high-beam lamp
30 . . . low-beam lamp
40 . . . directional indicator lamp
12, 13 . . . LED light source
110, 111 . . . entrance surface
11 . . . light guide
R . . . emission surface
141 . . . reflecting surface (first reflecting surface)
142 . . . reflecting surface (fourth reflecting surface)
151 . . . reflecting surface (second reflecting surface)
152 . . . reflecting surface (fifth reflecting surface)
161 . . . reflecting surface (third reflecting surface)

The invention claimed is:

1. A vehicle lamp fitting comprising a first light source, a second light source and a light guide which guides light from the first light source and second light source, wherein the light guide has
entrance surfaces through which light from the first light source and second light source enters,
an emission surface through which light that has entered through the entrance surfaces is emitted to the outside,
and an internally reflecting surface which causes light that has entered through the entrance surfaces to be reflected, wherein the internally reflecting surface comprises a plurality of first reflecting surfaces which are provided in a first region and which direct light from the first light source in a first direction so that light is emitted from the light guide, a plurality of second reflecting surfaces which are provided in a second region and which direct light from the second light source in the first direction so that light is emitted from the light guide, third reflecting surface which is formed in a third region between the first region and the second region, which is substantially parallel to the emission surface in the third region and which thereby limits the light intensity with which light from the first and second light sources is emitted in the first direction from the emission surface, a plurality of fourth reflecting surfaces which are formed in the first region and are formed in such a way that light from the second light source is emitted in a second direction that is different from the first direction, and a plurality of fifth reflecting surfaces which are formed in the second region and are formed in such a way that light from the first light source is emitted in the second direction, characterized in that the first and fourth reflecting surfaces are formed alternately and consecutively in the first region, the second and fifth reflecting surfaces are formed alternately and consecutively in the second region, the third reflecting surface is formed at a joint portion between an end one of the first reflecting surfaces and an end one of the second reflecting surfaces; and the light guide has a bent portion that is bent, and the third reflecting surface is formed in the bent portion.

2. The vehicle lamp fitting as claimed in claim 1, wherein the third reflecting surface is formed in such a way that it does not emit light to the outside through the emission surface.

* * * * *